J. H. LORIMER.
VEHICLE WHEEL TIRE.
APPLICATION FILED NOV. 12, 1906. RENEWED MAY 26, 1911.
1,014,075.
Patented Jan. 9, 1912
2 SHEETS—SHEET 1.
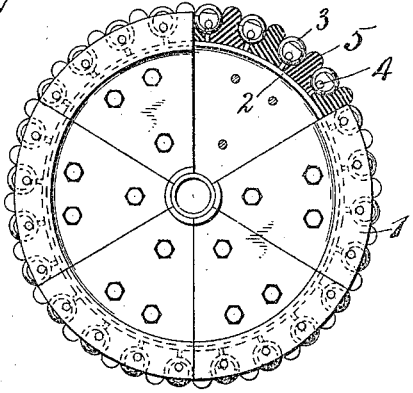
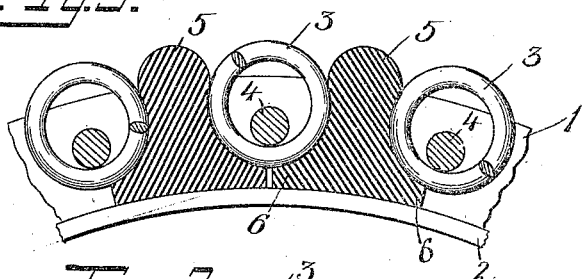
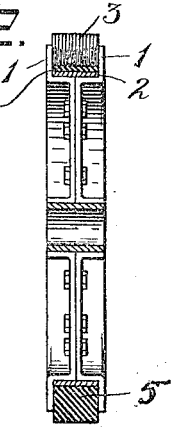
Witnesses
Inventor
John H. Lorimer J. H. LORIMER.
VEHICLE WHEEL TIRE.
APPLICATION FILED NOV. 12, 1906. RENEWED MAY 26, 1911.

1,014,075.

Patented Jan. 9, 1912.

2 SHEETS—SHEET 2.

Witnesses

Inventor
John H. Lorimer
By his Attorneys

UNITED STATES PATENT OFFICE.

JOHN H. LORIMER, OF PHILADELPHIA, PENNSYLVANIA.

VEHICLE-WHEEL TIRE.

1,014,075.  Specification of Letters Patent.  Patented Jan. 9, 1912.

Application filed November 12, 1906, Serial No. 342,981. Renewed May 26, 1911. Serial No. 629,556.

*To all whom it may concern:*

Be it known that I, JOHN H. LORIMER, a citizen of the United States, residing at Philadelphia, Philadelphia county, Pennsylvania, have invented certain new and useful Improvements in Vehicle-Wheel Tires, of which the following is a full, clear, and exact description.

My invention relates to improvements in wheels, and particularly the tires of wheels for vehicles.

The principal objects of the invention are to improve the tread so that it will wear longer and prevent skidding.

In my former Patent No. 811,646, dated February 6, 1906, I have shown a tire upon which this present invention is an improvement for certain types of work. In my former patent I have illustrated and described the use of rubber, or similar material, in conjunction with the spring tread units. In this present invention a particular arrangement of the yielding rubber or composition material is employed so that peculiar advantages of manufacture and repair and use are attained.

Briefly, the invention consists in the employment of rubber or similar composition to form tread portions alternating with the spiral spring tread units.

The composition treads may be formed in independent units or as a continuous band locked in place by the overlying spring units.

Figure 4:
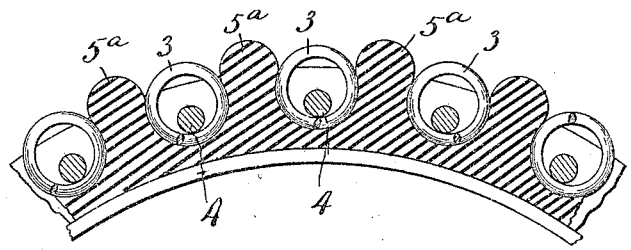
Figure 5:
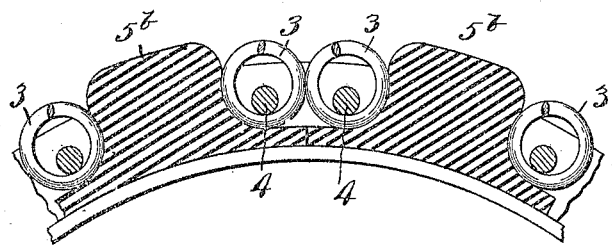
Figure 6:
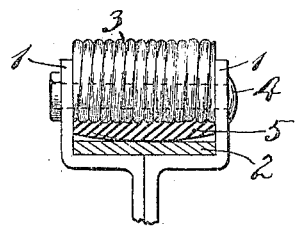

In the accompanying single sheet of drawings Figure 1 is a side elevation of a vehicle wheel embodying the improvements of my invention, a portion being broken away so as to show the arrangement with composition units in section. Fig. 2 is a vertical sectional view of the same. Fig. 3 is an enlarged fragmentary detail of the tire. Figs. 4 and 5 are sections of modifications. Fig. 6 is a cross section of another modification.

I will describe first the form shown in Figs. 1 to 3. 1—1 are rim flanges carried by any suitable type of wheel. Between the flanges is preferably arranged an annular supporting ring 2, which affords a continuous support for the tread units. Spiral spring tread units 3—3 are arranged transversely of the rim and held in place between the flanges 1—1 by means of bolts, rods or pins 4—4, which are preferably removable so that the spring units may be readily removed and replaced. Alternating with the spring units are composition units 5—5 of rubber or similar yielding material. These composition units 5 are preferably of an inverted T-shape in cross section, and each of these units may have a flange or heel 6 at each edge projecting under the bottom of an adjacent spring unit. These units 5 may be removed readily when an adjacent spring unit is removed, but are locked securely in place for use when all parts are assembled. By this construction the tire may be readily repaired if damaged in any portion. The composite form of tread in which the spring units (for instance steel coil springs) alternate with the resilient composition units, effectively prevents skidding either on hard or soft roadways. When the weight of the vehicle is upon one of the spring units, the spring itself yields and also the flanges of the adjacent composition units in radial direction, so that advantage is had of the resilient portions of the composition units. When the weight of the vehicle is upon a composition unit, the latter is compressed radially and also tends to expand tangentially, and thus displace somewhat the adjacent coil units. Greater adaptability to various and sudden changes of road conditions is thus afforded.

In Fig. 4, $5^a$—$5^a$ represent the projecting portions of a continuous band of resilient material arranged to perform the function of the units 5—5 previously described. In this construction the only modification over that shown in Fig. 2, for example, is in the continuity of the units $5^a$.

In Fig. 5 I have illustrated a pair of spring units 3—3 arranged side by side instead of being spaced by one of the units 5, as first described. In this figure I have also shown the exposed portions of the resilient units $5^b$ of greater length than shown in the other views.

In Fig. 6 I have illustrated in cross section the base of one of the units 5 (together with other parts) in which it will be seen that the base of said units is preferably convex on the side resting upon the band 2. This is preferable though not necessary. The purpose of convexing the lower surface of the units 5 is to give the spring room to bend easily when pressed down at its ends, in conforming to unevenness of road bed.

What I claim is:

1. A vehicle wheel tire, including individual tread units of coil springs and composition alternating with each other, and said composition units held in place by spring units.

2. A vehicle wheel tire, comprising a plurality of transversely arranged spiral spring tread units, and alternating composition tread units having flanges beneath said spring units and held thereby.

3. A vehicle wheel tire, including a rim, coil spring tread units and composition tread units, the latter being held in place by the former, and positive connections between the former and said rim.

4. A vehicle wheel tire, including a rim, coil spring tread units and resilient composition tread units placed between said coil spring units and underneath the same, and means for positively connecting said spring units to said rim.

5. A vehicle wheel tire, including a rim, coil spring tread units and composition tread units, the latter being held in place by the former, a plurality of said composition units being connected underneath the coil spring units, and means for positively connecting said spring units to said rim.

JOHN H. LORIMER.

Witnesses:
R. C. MITCHELL,
L. VREELAND.